United States Patent [19]

Pummer

[11] Patent Number: 5,218,869
[45] Date of Patent: Jun. 15, 1993

[54] DEPTH DEPENDENT BANDPASS OF ULTRASOUND SIGNALS USING HETERODYNE MIXING

[75] Inventor: Alexander C. Pummer, Pleasanton, Calif.

[73] Assignee: Diasonics, Inc., Milpitas, Calif.

[21] Appl. No.: 820,516

[22] Filed: Jan. 14, 1992

[51] Int. Cl.⁵ .......................................... G01N 29/000
[52] U.S. Cl. .................................. 73/629; 128/660.06
[58] Field of Search ................. 73/631, 629, 602, 599; 128/660.01, 660.06, 660.07

[56] References Cited

U.S. PATENT DOCUMENTS

| B1 4,016,750 | 5/1984 | Green | 73/629 |
| 4,197,750 | 4/1980 | Hassler | 73/629 |
| 4,463,608 | 8/1984 | Takeuchi et al. | 73/606 |
| 4,676,251 | 6/1987 | Bernatets | 73/599 |
| 4,738,138 | 4/1988 | Redman-White | 73/602 |
| 4,757,715 | 7/1988 | Miwa et al. | 128/660.06 |

Primary Examiner—Hezron E. Williams
Assistant Examiner—Nashmiya N. Ashraf
Attorney, Agent, or Firm—Blakely, Sokoloff, Taylor & Zafman

[57] ABSTRACT

An ultrasound imaging system and method for examining the interior of an object. The imaging system includes an apparatus for transmitting and receiving ultrasound waves. A receiver amplifies echo signals from over a range of depths from within the object and generates electrical signals, each having a spatial spectrum. The imaging system also includes a compensation apparatus which compensates the spectral distribution of the signal by sweeping the spectrum of the signals in accordance with the depth from which the echo signals are reflected. In the currently preferred embodiment, the compensation apparatus sweeps from the low frequencies to the high frequencies of the spectrum.

12 Claims, 2 Drawing Sheets

FIG_1
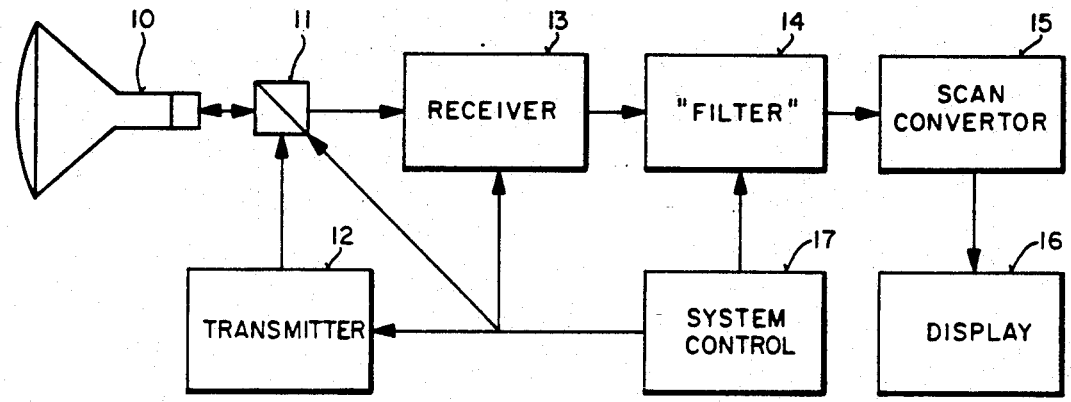
FIG_2
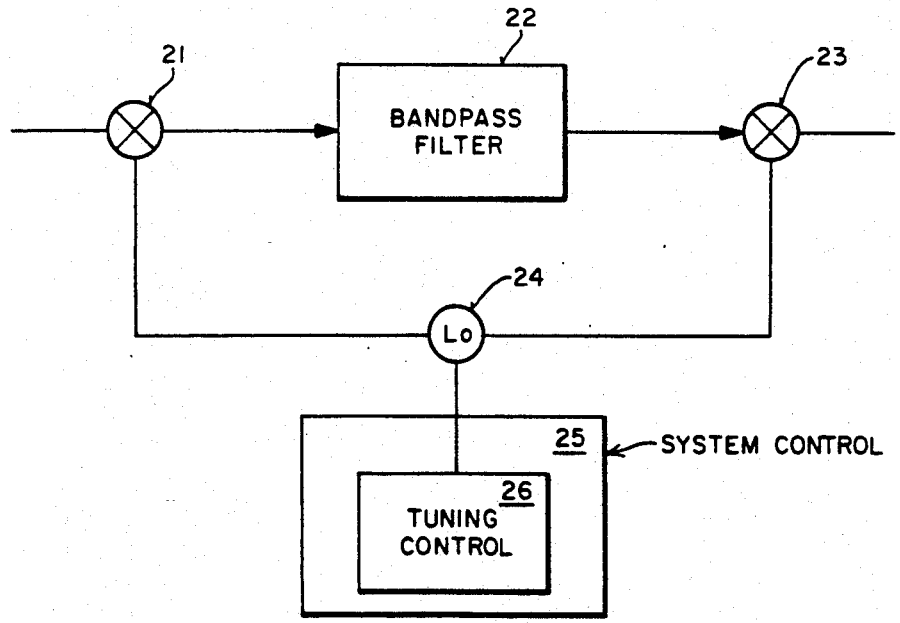

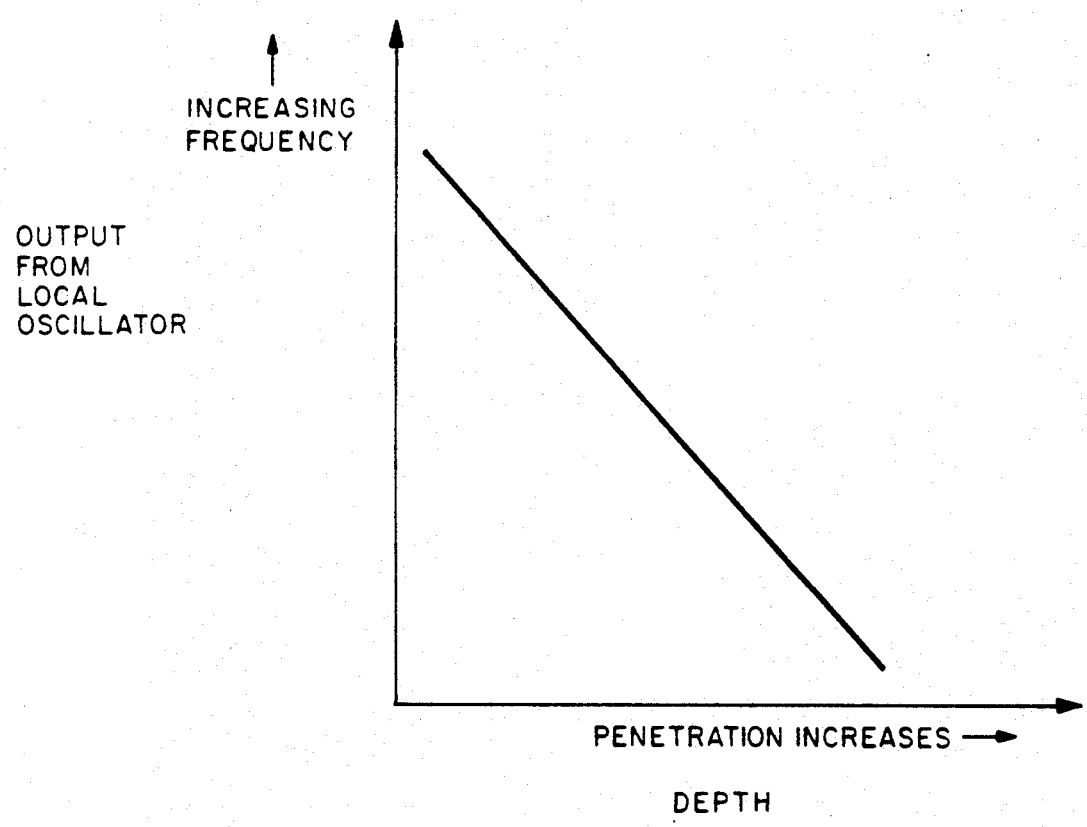
FIG_3

DEPTH DEPENDENT BANDPASS OF ULTRASOUND SIGNALS USING HETERODYNE MIXING

FIELD OF THE INVENTION

The present invention relates to the field of ultrasound imaging: particularly, the present invention relates to an apparatus and method for processing ultrasonic data.

BACKGROUND OF THE INVENTION

During recent decades, ultrasonic technology has become a vital tool in examining the internal structure of living organisms. The technology employed has applications in diagnosis of various medical aliments where it is useful to examine soft tissues within the body which show structural details such as organs and blood flow. By examining the soft tissues within the body, the medical staff can locate the portions which may indicate the presence of disease or abnormalities.

To examine the internal body structure, ultrasonic images are formed by producing ultrasonic waves using a transducer, passing the waves through a body, and measuring the properties of the scattered echoes (e.g., amplitude and phase) from reflections from varying depths within the body using a receptor or receiver. Typically, a narrow beam is employed which often is focused at a depth within the body in order to improve lateral resolution. The received echo signals are utilized by an image processing system to generate an image of the object, typically referred to as a B-scan image.

The strength of the received echo signals is diminished due to the attenuation of the ultrasonic waves. The ultrasonic waves are subject to two types of attenuation. First, attenuation occurs as a result of widening the beam pattern. As the beam pattern widens, the ultrasonic waves must be distributed over a larger area. The widening of the beam pattern causes the intensity with which the ultrasonic waves travel to decrease. This decrease in intensity causes the amplitudes of the received echoes to attenuate according to the depth of the reflection. Secondly, the signals also attenuate with respect to the frequency of the ultrasonic waves. The attenuation coefficient of tissue increases linearly with frequency. Thus, the farther the ultrasonic waves travel into the body, the less it reflects as a function of the frequency. In this manner, the received ultrasonic signal drops in frequency according to the depth of penetration. This attenuation, or loss, is approximately one decibel (dB) per one megahertz (MHz) per one centimeter. Thus, for every one MHz of frequency, one dB is lost for every centimeter the ultrasonic waves travel into the body. Hence, an ultrasonic wave that is travelling deeper into the body loses its high frequency spectral components faster than an ultrasonic wave in the near field. Thus, the high frequency components are reduced by frequency dependent attenuation according to the depth of penetration.

It is common practice in the prior art to compensate for differences in amplitude attenuation of the received echoes using a variable gain amplifier on the received signal. This gain amplifier provides increased gain of the signal in order to offset the loss in amplitude suffered by the signal due to tissue absorption. However, this gain amplification does not compensate for changes in the spectral distribution of the echo signal with respect to the time or depth of penetration.

One prior art technique dealing with depth dependent attenuation is disclosed in U.S. Pat. No. 4,016,750, Green, entitled "Ultrasonic Imaging Method and Apparatus." Green discloses sweeping the filter according to the depth of the discontinuity from which the echo signals are reflected while receiving those echo signals. The sweeping of the filter, in conjunction with gain amplification of the signal, compensates the spectral distribution of the signal with respect to the depth of penetration. In Green's system, the varying of the filter is controlled by a voltage dependent capacitor as part of a tuned resonant circuit. The tuner is a voltage dependent tuner which tunes the filter based on the voltage of the received signal and a tuning voltage. Thus, the strength of the received signal influences the tuning of the filter. In such a system, when the signal level modulates, a corresponding modulation occurs on the center frequency of the filter. Therefore, since the center frequency of the filter is not accurate, the filter does not operate precisely as desired.

Also when using prior art systems, such as Green's system, the precise frequency of the filter used in compensating the signal is unknown. Typical filters in the prior art have a specified tolerance, such that the passband of the signal is somewhere within the tolerance of the filter. Thus, there is no certainty as to what the filter has been tuned. Furthermore, with the dithering effect of the signal voltage on the tuning of the filter, the problem is made worse. Thus, there is no precise control on the passband of the filter in the prior art.

The present invention provides a depth dependent bandpass filter for shaping the spectrum of the signal. In this manner, the signal is compensated for the depth dependent attenuation. The present invention also allows for the exact measure of the passband of the system. Moreover, the tuning is independent of the signal level of the received echo signals themselves, and, thus, is not affected by variations in the level of these signals.

SUMMARY OF THE INVENTION

An ultrasound imaging system and method for examining the interior of an object is described. The imaging system includes a transmitter for transmitting and receiving ultrasound waves. The transmitter receives echo signals from over a range of depths from within the object and generates an electrical signals, each having a spatial spectrum. The imaging system also includes a compensation apparatus which compensates the spectral distribution of the signal by sweeping the spectrum of the signal in accordance with the depth from which the echo signals are reflected. In the currently preferred embodiment, the compensation apparatus sweeps from the high frequencies to the low frequencies of the spectrum of the received echo signals.

In the currently preferred embodiment, the compensation apparatus is a heterodyne mixer which shifts the signal to a predetermined intermediate frequency in order to compensate the signal. The heterodyne mixer of the present invention includes a local oscillator, a first mixer, a non-variable filter and a second mixer. The local oscillator sweeps a waveform over a predetermined range of frequencies. The first mixer receives the signal and the waveform from the local oscillator and shifts the frequency of the signal to the predetermined, intermediate frequency. The filter receives the shifted signal and filters the signal at the predetermined frequency. In the currently preferred embodiment, the filter is a finite impulse response filter. The second mixer then receives the filtered signal and the waveform of the predetermined frequency from the local oscillator. In response to these inputs, the second mixer outputs the signal, such that the signal is compensated, while cancelling the local oscillator frequency influence on the signal. Thus, the output of the second mixer returns to the same spectrum as when the signal was input into the heterodyne mixer.

The present invention also includes a method for shaping the spectrum of a signal derived from received ultrasound waves reflected from discontinuities within an object. The method includes the step of sweeping the spectrum of the signal to a predetermined frequency by mixing the signal with a signal of a predetermined frequency from a local oscillator. The method also includes the step of filtering the signal at a predetermined fixed frequency. The method further includes the step of cancelling the predetermined frequency from in the signal, such that the signal is compensated for depth dependent changes in the spectral distribution of the echo signals.

BRIEF DESCRIPTION OF THE DRAWINGS

The present invention will be understood more fully from the detailed description given below and from the accompanying drawings of the preferred embodiments of the invention which, however, should not be taken to limit the invention to a specific embodiment but are for explanation and understanding only.

FIG. 1 is a block diagram of the ultrasound imaging system of the present invention.

FIG. 2 is a block diagram of the currently preferred embodiment of the heterodyne mixer of the present invention for accommodating depth dependent attenuation.

FIG. 3 illustrates the tuning controller response and its operation for a range of depths.

DETAILED DESCRIPTION OF THE PRESENT INVENTION

An ultrasonic imaging apparatus and method for examining the internal structure of an object is described. In the following description, numerous specific details are set forth such as specific processing steps, bit lines, etc., in order to provide a thorough understanding of the present invention. It will be obvious, however, to one skilled in the art that the present invention may be practiced without these specific details. In other instances, well-known signal processing steps have not been described in detail to avoid unnecessarily obscuring the present invention.

FIG. 1 depicts a block diagram of the ultrasonic imaging system of the present invention. Referring to FIG. 1, the ultrasonic imaging system comprises a transducer 10 coupled to gated switch 11 for transmitting and receiving ultrasonic wave pulses to the object. Gated switch 11 is coupled to transmitter 12 for sending transmitted ultrasonic waves to transducer 10 from transmitter 12. Gated switch 11 is also coupled to receiver 13 for sending reflected (i.e., echo) ultrasonic waves received by transducer 10 to receiver 13. The operation of gated switch 11, transmitter 12 and receiver 13 is controlled by signals from system control 17. Receiver 13 is also coupled to filter 14 for sending the received signals to filter 14 to be compensated for depth dependent attenuation. The operation of filter 14 is controlled by signals from system control 17. The output of filter 14 is coupled to scan converter 15 for processing the signals to produce the data necessary for forming the image representation of the the signals. Display 16 is coupled to the output of scan converter 15 for displaying the image data.

Transducer 10 transmits and receives ultrasonic pulse signals. Ultrasonic waves are generated as pulses by transducer 10 and transmitted into a medium such as a human body, usually being focused during transmission by an acoustic lens. In the currently preferred embodiment, the pulse is supplied to transducer 10 from a gated switch 11 which repeatedly transmits and receives ultrasonic wave pulses. Typically, the frequency of the pulses of the ultrasonic waves ranges from 1-30 MHz. The gated switch 11 supplies ultrasonic wave pulses to transducer 10 from transmitter 12 under the control of system control 17. The imaging system of the currently preferred embodiment supports pulse echo operation, although continuous wave operation may be employed as well.

Ultrasonic wave pulses are reflected from the boundaries, called discontinuities, within the structure of the object (i.e., reflected echo signals). These reflected echo signals are received by transducer 10 and sent to gated switch 11. Gated switch 11 receives the reflected echo signals and converts them into electrical analog signals. The resultant electrical signals are supplied to receiver 13 under control of system control 17.

In performing the B-scan imaging, the electrical signals are received by receiver 13 from various depths within the object. Receiver 13 varies the gain of the signal, such that the signal level is amplified according to the range of depths within the object. In this manner, the gain of receiver 13 varies in order to offset the amplitude loss of signals caused by acoustic absorption of the ultrasonic wave pulses within the subject. The variable gain amplifier of receiver 13 is well-known in the art. After the signals have been amplified, the signals are forwarded to filter 14.

Filter 14 performs heterodyne mixing on the signal in order to shape the spectrum of the signal. In so doing, filter 14 compensates the spectral distribution of the signal caused by the depth dependent attenuation within the object (e.g. human body). It should be noted that since receiver 13 performs the gain amplification on the received signal and filter 14 performs the frequency compensation, the present invention allows for independent control of the gain on the signal. Thus, any gain amplification is independent of the frequency compensation of filter 14. The compensated signal is output from filter 14 and input into scan converter 15 where it is demodulated. In the currently preferred embodiment, scan converter 15 performs envelope detection to demodulate the signal. Scan converter 15 produces an output of a signal which is proportional to the envelope of the high frequency signal output from receiver 12. The output signal from scan converter 15 is input into display 16 for displaying the B-scan image of the object.

FIG. 2 depicts a block diagram of the currently preferred embodiment of the heterodyne mixer of the present invention. Referring to FIG. 2, the signals received by the receiver (FIG. 1) are coupled and input to one input of mixer 21. The other input of mixer 21 is supplied with a signal of predetermined frequency from the output of local oscillator 24. The output of mixer 21 is coupled to the input of bandpass filter 22. The output of bandpass filter 22 is coupled to one input of mixer 23.

The other input of mixer 23 is coupled to the output of local oscillator 24. The output of mixer 23 is coupled to the scan converter of the currently preferred embodiment (FIG. 1). The local oscillator 24 is controlled by a tuning controller 26 in the system control 25.

Functionally, mixer 21 multiplies the input spectrum ($f_s$) from the receiver and the driving input frequency, $f_{LO}$, from local oscillator 24 together. Local oscillator 24 effectively drives mixer 21 from the second input. In the currently preferred embodiment, local oscillator 24 is a variable frequency generator which can be adjusted by the tuning controller 26 of system control 25, to provide a wide range of frequency coverage (i.e., sweep the spectrum of frequencies). By sweeping the output frequency, $f_{LO}$, of local oscillator 24 repeatedly over some range, local oscillator 24 modulates the output of mixer 21.

As local oscillator 24 is swept through its range of frequencies, different input frequencies in the input spectrum, $f_s$, are successively mixed to the intermediate frequency (IF) passband. In other words, mixer 21 and local oscillator 24 shift the signal derived from the echo signals at the (variable) input frequency to a fixed intermediate frequency (IF). The IF is located where most of the gain and selectivity are concentrated. Thus, the output of mixer 21 is a signal at an intermediate frequency generated in the receiving system by the process of mixing. The value of the intermediate frequency is a design choice. The resulting signal output from mixer 21 contains their sum and difference frequencies, $f_s \pm f_{LO}$. In the currently preferred embodiment, either the sum ($f_s + f_{LO}$) or difference ($f_s - f_{LO}$) output from mixer 21 can be sent to filter 22 of the heterodyne mixer of FIG. 2.

The output of mixer 21 is input to bandpass filter 22. In the currently preferred embodiment of the present invention, bandpass filter 22 is a non-variable filter fixed at the IF passband. The specific value of the IF is a design choice based on the availability and cost of parts. Bandpass filter 22 selects the spectrum, either the sum or difference, and outputs the filtered signal to mixer 23. The filtering of the spectrum essentially eliminates the frequency components outside the passband frequency at the signal. For example, bandpass filter 22 selects the spectrum ($f_s + f_{LO}$ or $f_s - f_{LO}$). The operation of bandpass filter 22 and other bandpass filters are well-known in the art. Therefore, as local oscillator 24 is swept through its range of frequencies and mixer 21 outputs the signals to the intermediate frequency, filter 22 eliminates the portion of the signal outside the intermediate frequency.

The selected spectrum output from bandpass filter 22 is input to one input of mixer 23 either $f_s + f_{LO}$ or $f_s - f_{LO}$ depending on filter 22. Local oscillator 24 drives mixer 23 at its second input with its output signal at the same predetermined frequency, $f_{LO}$, as input into mixer 21. The output of the mixer 23 is a product of the spectrum plus or minus the frequency of local oscillator 24, thus returning the signal to its original frequency spectrum. Therefore, by sweeping local oscillator 24 from the low frequencies, $f_{LO, LO}$, to the high frequencies, $f_{LO, HIGH}$, the output spectrum is shaped by the amplitude frequency response of IF bandpass filter 22.

The output spectrum in the frequency dimension will be identical to the input spectrum independent of the frequency of local oscillator 24. In this manner, the stability of local oscillator 24 does not factor into the accuracy of the heterodyne mixing because it uses the same frequency to mix up and mix down the frequency of the signal. It should be noted that normally in prior art IF systems, the IF is considerably different from the output of the system to the input of the system, wherein the frequency of the spectrum either shifted up or down in frequency.

In sum, the heterodyne mixer sweeps local oscillator 24 to obtain the entire signal using a constant fixed filter 22, thereby continuously extracting the frequencies of the spectral distribution of the received signal. Furthermore, it should be noted that the output of the heterodyne mixer may require filtering to cancel the unwanted components of the spectrum and local oscillator 24 produced by mixer 23. This occurs typically where the input to mixer 23 is the sum of the spectrum frequency $f_s$ and the local oscillator frequency $f_{LO}$ and the output of mixer 23 is the sum of its input and the local oscillator (i.e. $(f_s + f_{LO}) + f_{LO}$). In this case, the output frequency is relatively high, such that it is easy to filter.

The frequency sweep range of local oscillator 24 and the center frequency of IF bandpass filter 22 are selected according to design and cost considerations. In the currently preferred embodiment, the IF and the frequency of local oscillator 24 could be between 35 and 100 MHz. By using different IF frequency values for different transducers, it is not necessary to switch the bandwidth of the IF filter. Thus, the present invention provides independent control of the bandwidth and the center frequency of the system.

The sweep rate is controlled by the tuning control 26 in system control 25. A sweep occurs during the time necessary to receive another vector of ultrasound receive signals (i.e. an ultrasound line). In the body, frequency dependent attenuation exists, such that the farther that ultrasonic waves go in, the less that they come back. Thus, where persons adjusting the depth of the ultrasound view (from the skin inward), the sweep of local oscillator 24 responds fast enough to sweep during the shortest depth into the body or object that might be selected.

The sweep of the local oscillator is controlled by the tuning control 26 in system control 25. In the currently preferred embodiment, the tuning elements of local oscillator 24 are not in contact with the signal being compensated, as is the case in the prior art. Therefore, the signal level (i.e., voltage) of the received echo signals does not affect the tuning of local oscillator 24. By tuning independent of the reflected signal, the image quality improves. Furthermore, since the sum of the signal voltage and the tuning voltage determines the frequency of the filter in the prior art, when the tuning voltage gets really small the only voltage to determine the filter frequency is that of the signal. This produces a very narrow tuning range. To compensate for this, in the prior art, groups of filters or banks of filters were used and were switched between each other to cover the whole signal range. In the currently preferred embodiment of the present invention, the entire band (and more) can be covered continuously with one filter. The signals are swept from the beginning to the end without having to change or switch banks of filters. Therefore, the present invention advantageously accommodates a much wider bandwidth and much wider tuning range.

Another advantage of the currently preferred embodiment is that it allows the exact passband of the system to be determined. Since the frequency of local oscillator 24 and the frequency of the input spectrum can be measured exactly, an exact measure of the passband of the system can be calculated. In the prior art, components providing filtering only specified ranges within which the signal would be passed. These ranges amounted to the tolerances of the respective parts. The present invention allows for the exact determination of the passband of filter 22. In the currently preferred embodiment, the exact placement of the filter is fixed and the IF can measure the frequency of filter 22 by subtracting the frequency of the input spectrum from the frequency of local oscillator 24. This advantage is not present in the prior art systems.

Also in the prior art, to implement a tunable IF filter, a tuning circuit is required. These prior art tuning circuits typically include an inductor coupled to a capacitor in parallel. The peak response of the LC tuned circuits was at its resonant frequency where the impedance of the LC circuit goes to infinity. The resonant frequency for the LC tune circuits is determined according to the equation:

$$f = \frac{1}{2\pi \sqrt{LC}}$$

The peak response of the tune circuits limits the tune frequency range from a one to three ratio proportioned between the frequency of the filter and the frequency of the input spectrum. In the present invention, this limit does not exist. For instance, using an IF filter with a center frequency of 30 MHz, a signal swept from 2 MHz to 12 MHz would require local oscillator frequencies of 28 MHz through 18 MHz. In this case, the ratio of the local oscillator frequencies (18 and 28) produces a ratio of approximately 1 to 1.5. This is much less than the 1 to 3 ratio that was only possible in the prior art. Thus, the present invention allows the tune frequency range to be larger.

The present invention is also a linear system, wherein the sweeping voltage is directly related to the frequency of local oscillator 24 and has made the tuning of local oscillator 24 linear with the voltage that controls it. Being a linear system allows the frequency to be adjusted as a function of time in a predictable way. In this manner, the received signal can be compensated for depth dependent attenuation over a range of frequencies. FIG. 3 illustrates the tuning controller response and its operation for a range of depths. Therefore, the present invention provides another advantage in that the imaging system is linear.

Whereas many alterations and modifications of the present invention will no doubt become apparent to a person of ordinary skill in the art after having read the foregoing description, it is to be understood that the particular embodiment shown and described by illustration are in no way intended to be considered limiting. Therefore, reference to the details of the preferred embodiments are not intended to limit the scope of the claims which themselves recite only those features regarded as essential to the invention.

Thus, an ultrasound imaging system and method for examining the interior of an object has been described.

I claim:

1. An ultrasonic imaging apparatus for examining the interior of objects comprising:
    means for transmitting and receiving ultrasound through an object, said means receiving echo signals over a range of depths from within said object and generating electrical signals having a spatial spectrum with a spectral distribution in response to said echo signals; and
    compensation means for compensating for depth dependent changes in the spectral distribution of the echo signals by sweeping said spectrum of said electrical signals in accordance with the depth from which the echo signals are reflected while receiving said echo signals, said compensation means including means for filtering the electrical signals, wherein said means for filtering in fixed such that said electrical signals are filtered at one frequency.

2. The imaging apparatus defined in claim 1 wherein said compensation means sweeps increasingly lower frequencies of said spectrum as the depth from which the echo signals are received increases, such that said spectrum is swept.

3. An ultrasonic imaging apparatus for examining the interior of objects comprising:
    means for transmitting and receiving ultrasound through an object, said means receiving echo signals over a range of depths from within said object and generating electrical signals having a spatial spectrum with a spectral distribution in response to said echo signals; and
    compensation means for compensating for depth dependent changes in the spectral distribution of the echo signals by sweeping said spectrum of said electrical signals in accordance with the depth from which the echo signals are reflected while receiving said echo signals, wherein said compensation means includes a heterodyne mixer for shifting said electrical signals to a predetermined frequency in order to compensate said electrical signals.

4. An ultrasonic imaging apparatus for examining the interior of objects comprising:
    means for transmitting and receiving ultrasound through an object, said means receiving echo signals over a range of depths from within said object and generating electrical signals having a spatial spectrum with a spectral distribution in response to said echo signals; and
    compensation means for compensating for depth dependent changes in the spectral distribution of the echo signals by sweeping said spectrum of said electrical signals in accordance with the depth from which the echo signals are reflected while receiving said echo signals.
    wherein said compensation means further includes:
    first mixing means for receiving said electrical signals, said electrical signals being at an original frequency, and shifting said electrical signals from said original frequency to a predetermined frequency;
    filter means for filtering said shifted electrical signals at said predetermined frequency, said filter means being fixed; and
    second mixer means for shifting said electrical signals to said original frequency, such that the signal-to-noise ratio of said electrical signals is improved over the range of depths of operation.

5. The imaging apparatus as defined in claim 4 further comprising an oscillator for generating an oscillator signal, said oscillator signal being input to said first and second mixing means, wherein said oscillator signal produces a first and second effect on the outputs of said first and second mixing means respectively, such that said first effect is cancelled by said second effect.

6. An ultrasonic imaging apparatus for examining the interior of objects comprising:

means for transmitting and receiving ultrasound through an object, said means receiving echo signals over a range of depths from within said object and generating electrical signals having a spatial spectrum with a spectral distribution in response to said echo signals;

first mixing means for receiving said electrical signals, said electrical signals being at an original frequency, and shifting said electrical signals from said original frequency to a predetermined frequency;

filtering means for filtering said shifted electrical signals at said predetermined frequency, said filter means being fixed;

second mixing means for shifting said electrical signals to said original frequency, such that said spectrum of said electrical signals is shaped over the range of depths of operation; and an oscillator for generating an oscillator signal, said oscillator signal being input to said first and second mixing means, wherein said oscillator signal produces a first and second effect on the outputs of said first and second mixing means respectively, such that said first effect is cancelled by said second effect.

7. The imaging apparatus defined in claim 6 wherein said oscillator is varied over time in accordance with the depth from which said echo signals are reflected while receiving said echo signals, such that said oscillator sweeps the frequency of said oscillator signal as the depth from which the echo signals are received increases.

8. The imaging apparatus defined in claim 6 wherein said oscillator sweeps increasingly lower frequencies of said spectrum as the depth from which the echo signals are received increases, such that said spectrum is swept.

9. The ultrasonic imaging apparatus defined in claim 6 wherein said filtering means is a bandpass filter.

10. An ultrasonic imaging apparatus for examining the internal structure of objects comprising:

means for transmitting and receiving ultrasound through an object, said means receiving echo signals over a range of depths from with said object and generating electrical signals having a spatial spectrum with a spectral distribution in response to said echo signals; and double mixing means for receiving said electrical signals and compensating said electrical signals for depth dependent attenuation over said range of depths to produce said electrical signals having an output spectrum, said mixing means including oscillation means for shifting said electrical signals to an intermediate frequency, said oscillation means also shifting said electrical signals to said spectral distribution, such that said electrical signals are independent of said frequency of said oscillation means.

11. An ultrasonic imaging apparatus comprising:

means for transmitting and receiving ultrasound through an object, said means receiving echo signals over a range of depths from within said object and generating electrical signals having a spatial spectrum with a spectral distribution in response to said echo signals; and mixing means for compensating said electrical signals for depth dependent changes in the spectral distribution of the echo signals, said mixing means comprising:

a heterodyne mixer for performing heterodyne mixing on said electrical signals, said heterodyne mixer including a local oscillator; and a cancellation means for remixing said electrical signals using said local oscillator, such that spectrum of said electrical signals output from said cancellation means is the same as the spectrum of said electrical signals input into said heterodyne mixer.

12. A method for shaping a spectrum of electrical signals having a spectral distribution that is derived from received ultrasound waves reflected from discontinuities within an object, said method comprising the steps of:

sweeping the spectrum of said electrical signals to an intermediate frequency by mixing said electrical signals with an oscillator frequency from a local oscillator;

filtering said electrical signals at said intermediate frequency; and cancelling said oscillator frequency from in said electrical signals, such that said electrical signals are compensated for depth dependent changes in the spectral distribution of the echo signals.

* * * * *